July 19, 1949.  I. ERICKSON ET AL  2,476,485
WEEDLESS FISH LURE
Filed May 16, 1947
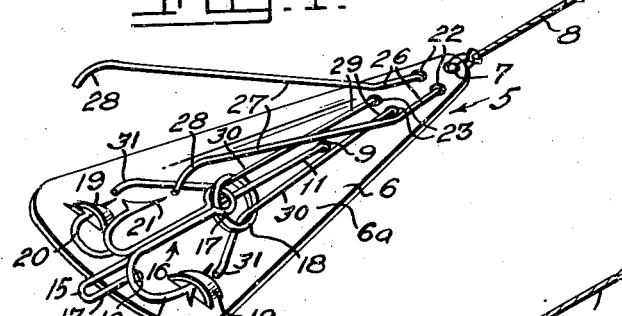
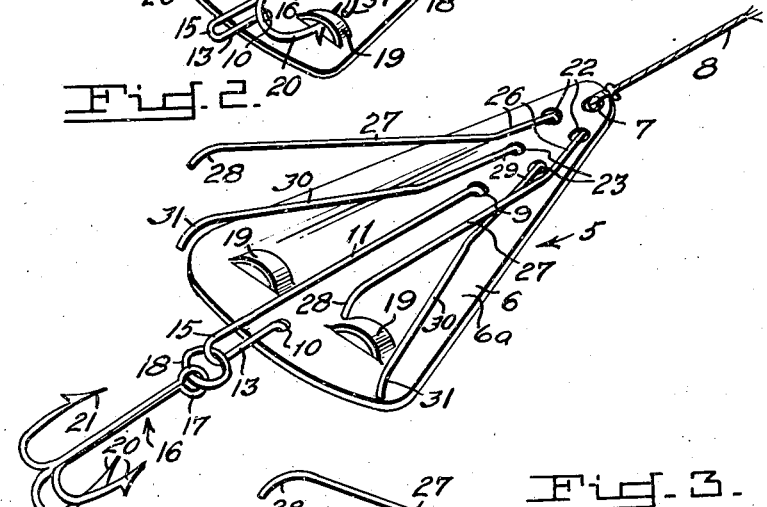
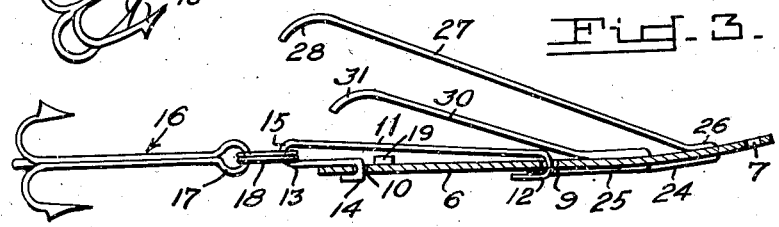
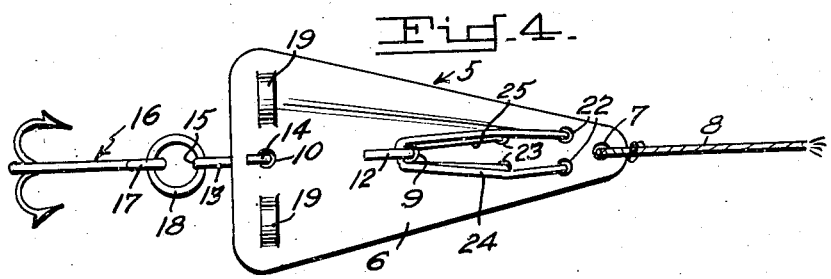
Inventors
Ingemar Erickson
Robert H. Miller
By *Randolph & Beavers*
Attorneys Patented July 19, 1949

2,476,485

UNITED STATES PATENT OFFICE 2,476,485

WEEDLESS FISH LURE

Ingemar Erickson and Robert H. Miller, Milwaukee, Wis.

Application May 16, 1947, Serial No. 748,474

6 Claims. (Cl. 43—42.4)

This invention relates to a novel construction of weedless fish lure and more particularly to a weedless lure for use with a multiple barbed hook and wherein only one of the barbs thereof is exposed when the lure is arranged in a fishing position and which is constructed and arranged so that the hook will be moved to an exposed position by the action of a fish striking the lure for releasing and exposing the barbs for engagement with the fish for insuring a better hooking of the fish and for minimizing the possibility of losing the fish.

More particularly, it is an object of the invention to provide a fish lure including a slidably supported hook and with means for releasably retaining all but a single barb of the hook in a protected position until the hook is released and moved to an exposed position by a fish striking the lure.

Still a further object of the invention is to provide a lure possessing the aforedescribed characteristics and which is extremely simple in construction, very durable and capable of being quickly adjusted to a fishing position and which is so constructed and arranged that the multiple barbed hook thereof will be insured of moving to an exposed position when a fish strikes the lure.

Various other objects and advantages of the invention will hereinafter become more fully apparent from the following description of the drawing, illustrating a preferred embodiment thereof, and wherein:

Figure 1 is a perspective view showing the upper side of the lure in a set or fishing position;

Figure 2 is a similar view showing the lure with the multiple barbed hook in an exposed position;

Figure 3 is a longitudinal, substantially central sectional view, partly in side elevation of the lure as shown in Figure 2, and Figure 4 is a bottom plan view of the lure in its position of Figure 2.

Referring to the drawing, the improved fishing lure in its entirety is designated generally 5 and includes an elongated, substantially flat lure body or minnow 6 which is relatively wide at its rear end and relatively narrow at its forward end and which includes rounded ends and forwardly converging side edges. The lure body 6 at its forward, restricted end is provided with an eye or opening 7 for receiving a fishing line 8 or a leader or swivel.

The lure body 6 is provided with longitudinally spaced substantially centrally disposed openings 9 and 10 for receiving and anchoring a relatively heavy gauge strand of wire 11 thereto. The strand 11 has an elongated portion disposed longitudinally over the face 6a of the body 6 and which is provided with a turned-back forward end 12, as seen in Figure 4, which is engaged through the forward opening 9 and the opposite rear end of the strand 11 is provided with a downwardly or inwardly turned back portion 13 which terminates in a second downwardly turned back hook portion 14. The hook portion 14 extends in the same direction as the hook portion 12 and engages the other rear opening 10 which is located adjacent the rear end of the body 6 so that a part of the turned back portion 13 extends beyond the rear end of the body 6 to thus afford a substantially U-shaped portion 15, which constitutes a part of the strand 11 and which is disposed rearwardly of the lure body or minnow 6.

A triple barbed hook, generally designated 16, is provided with an eye 17 at its shank end which is attached to a split ring 18 which is in turn slidably engaged with the longitudinally extending portion of the wire 11. The lure body 6 adjacent its rear wide end is provided with transversely extending struck-up portions 19 forming integral parts of the lure body 6 and which are formed by slitting the body transversely along transverse lines and pressing up the portions between the contiguous, substantially parallel slits. The struck-up portions 19 form retaining means adapted to be engaged by two of the barbs 20 of the hook 16 when said lure 5 is in a fishing position, as seen in Figure 1 and with the hook shank disposed along the wire 11, and with the ring 18 disposed substantially intermediate of the ends of said wire. When the hook 16 is thus disposed on the face 6a, the third barb 21 is spaced upwardly from the lure body 6, as seen in Figure 1.

The lure body 6 is provided with a pair of transversely spaced apertures 22 adjacent the narrow forward end thereof and with a second pair of transversely spaced apertures 23 which are longitudinally spaced from the apertures 22 and disposed between said apertures 22 and the opening 9. Two elongated strands of relatively light gauge wire 24, and 25, respectively, are folded upon themselves intermediate their ends and have their intermediate portions disposed between the hook 12 and the under or back side of the body 6 for anchoring the strands 24 and 25 thereby to the lure body 6. The two legs of the strand 24, as seen in Figure 4, extend forwardly from the hook 12 and one of said legs extends through each of the apertures 22. The legs of the strand 24 are bent back upon themselves on the upper or front side of the lure body 6 and have portions 26 which engage the upper side of the lure body and which are disposed in rearwardly diverging relationship to one another. The free ends 27 of the legs of the strand 24 extend from the portions 26 upwardly and rearwardly with respect to the lure body 6 and in diverging relationship relatively to one another and terminate slightly beyond the rear end of the lure body 6 in downwardly curved portions 28. The strand portions 27 and 28 combine to form resilient weed guards for protecting the exposed barb 21 from weeds and other submerged matter when the lure 5 is drawn in a submerged position through a body of water.

The legs of the strand 25 extend forwardly from the hook 12 and upwardly through the openings 23 and are bent back upon themselves thereabove to provide the rearwardly diverging portions 29 which extend along the upper side of the body 6. Said legs of the strand 25 include resilient portions 30 which project upwardly and rearwardly relatively to the body 6 from the rear ends of the portions 29 and which terminate in the curved terminals 31.

The resilient strand portions 30 are adapted to be drawn toward one another and to positions adjacent the strand 11 so that when the ring 18 is moved forwardly along the strand 11 from its position of Figure 2 to its position of Figure 1, ring 18 it can be passed over the curved terminals 31 and upwardly along the resilient portions 30 so that when the barbs 20 are in engagement with the struck-up retaining portions 19, the strand portions 30 will engage the ring 18, as seen in Figure 1 for resiliently retaining said ring and the hook 16 in the position of Figure 1 and with the curved terminals 31 disposed adjacent the terminals of the barbs 20. The resilient strand portions 30 will offer sufficient frictional resistance to the ring 18 to prevent the hook 16 from sliding to its released position of Figure 2 until the fish strikes the lure 5 and becomes hooked upon the barb 21. When this occurs, the lure body 6 will slip forwardly of the fish's mouth and the barb 21 by being hooked to the fish will cause a pull to be exerted on the hook 16 sufficiently to retract the strand portions 30 toward one another so that the ring 18 can slip rearwardly therealong and along the strand 11 until the ring 18 disengages the terminals 31 and assumes the position of Figure 2 on the U-shaped portion 15 of the strand 11, thus permitting the hook retaining members 30 to assume the positions of Figure 2. As the lure body slides forwardly relatively to the hook 16, the barbs 21 will disengage the body 6 before said body is withdrawn from the mouth of the fish so that the exposed barbs 20 will thereafter also be engaged in the mouth of the fish.

It will thus be seen that a weedless fish lure has been provided including a triple barbed hook.

Various modifications and changes are contemplated and may obviously be resorted to, without departing from the spirit or scope of the invention as hereinafter defined by the appended claims.

We claim as our invention:

1. In a fish lure of the character described, a lure body, a multiple barbed fish hook slidably connected to said lure body, resilient means for releasably retaining the fish hook against a face of the lure body and with all but one of the barbed hooks in covered, protected positions, and guard means for protecting the exposed barb of the hook from being fouled by weeds.

2. In a fish lure of the character described, a lure body, a fish hook slidably connected to said lure body, resilient means for retaining said hook in a retracted position against a face of the lure body, and means supported by the lure body for protecting a barb of the hook from being fouled by weeds or the like, said hook being adapted to be released by engagement with a fish for sliding movement to an exposed position rearwardly of the lure body.

3. A fishing lure as in claim 2, a wire anchored at its ends to the lure body and having an elongated portion extending longitudinally of the face thereof and an integral loop portion disposed rearwardly of the lure body and by means of which said hook is slidably tethered to the lure body.

4. A fishing lure as in claim 2, a wire anchored at its ends to the lure body and having an elongated portion extending longitudinally of the face thereof and an integral loop portion disposed rearwardly of the lure body and by means of which said hook is slidably tethered to the lure body, said lure body being provided with a plurality of resilient strand members projecting rearwardly and outwardly with respect to said aforementioned side thereof and forming weed guards, a ring connecting the hook to said first mentioned wire, and certain of said resilient weed guards extending through said ring when the hook is in a retracted position for frictionally retaining the ring in a forward position relatively to the lure body.

5. In a fishing lure of the character described, a lure body, weed guard means carried by the lure body, a fish hook slidably tethered to the lure body, and resilient means for releasably retaining the fish hook in a retracted, fishing position against a face of the lure body and protected by said weed guard means.

6. A fishing lure as in claim 5, said hook being provided with a plurality of barbs, said lure body having barb receiving recesses for containing all but one of the barbs when the hook is in a retracted position, and the exposed barb being disposed in a weed protected position relatively to the lure by said weed guard means and being adapted to be engaged by a fish for moving the hook to an exposed position rearwardly of the lure body.

INGEMAR ERICKSON.
ROBERT H. MILLER.

REFERENCES CITED

The following references are of record in the file of this patent:

UNITED STATES PATENTS

| Number | Name | Date |
| --- | --- | --- |
| 2,145,283 | Accetta | Jan. 31, 1939 |
| 2,247,806 | Foley | July 1, 1941 |
| 2,234,516 | Clark | Mar. 11, 1941 |